A. ALBRIGHT.
Vulcanizing Rubber-Coated Articles.
No. 137,872.          Patented April 15, 1873.
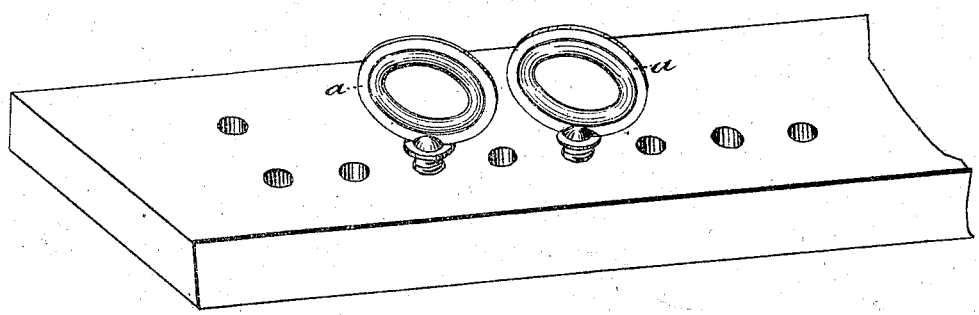
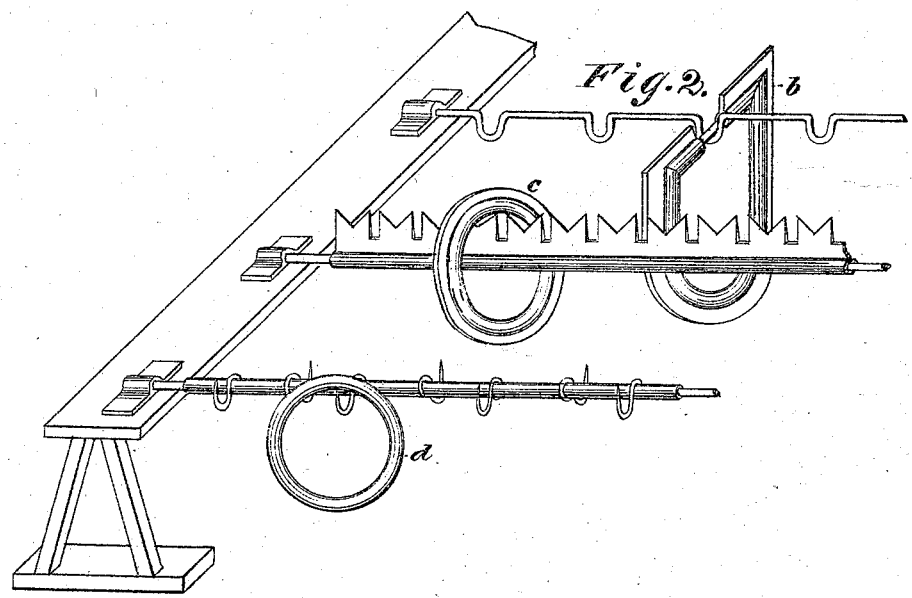
Witnesses
W. H. Palster
Joseph Englehart
Inventor:
Andrew Albright,
by his attys
Clayton &c.

UNITED STATES PATENT OFFICE.

ANDREW ALBRIGHT, OF NEWARK, NEW JERSEY.

IMPROVEMENT IN VULCANIZING RUBBER-COATED ARTICLES.

Specification forming part of Letters Patent No. 137,872, dated April 15, 1873; application filed February 8, 1873.

*To all whom it may concern:*

Be it known that I, ANDREW ALBRIGHT, of Newark, in the county of Essex and in the State of New Jersey, have invented a certain new and useful Process for Vulcanizing Rubber-Coated Harness-Trimmings and other Articles; and I do hereby declare that the following is a full, clear, and exact description thereof.

My invention relates to the manufacture of rubber-coated harness and carriage trimmings, and other articles covered with hard or vulcanized rubber; and it principally consists in exposing the articles to be vulcanized, suitably supported, to the direct action of steam or dry heat without the use of any packing, envelope, or mold.

In vulcanizing articles coated with rubber the general practice is either to pack the article in powdered soap-stone, dust, or other powder, or to place it in a metallic or mineral mold, or to envelop it in tin-foil or between thin metallic sheets, and then expose it to heat in the "vulcanizer."

Experience has proven to me that when the article to be vulcanized is properly supported, so that the plastic or soft rubber or gum will not lose its form by pressure, that either steam or dry heat may be admitted directly without any detriment; and that the process of vulcanizing can be performed in less time and with greater safety, making a better quality of goods at less cost.

The first step in this process is (after the articles have been "coated" with plastic gum) to support each article separately, so that there may be no pressure upon the gum. Articles which have a portion of metal uncovered may be supported by that portion.

In Figure 1, *a a* show terrets, supported by having their metallic shanks placed in sockets. *b* in Fig. 2 shows a buckle supported by a bow. I support rings and other similar articles, which have no metallic portion exposed, upon one or more points, as shown at *c d* in Fig. 2, so that the smallest possible portion of the gum shall be dented or pressed in.

Large or different-shaped articles may be supported on a larger number of points.

After the articles are properly coated with the plastic gum, and "supported" as described, and placed in the vulcanizer, steam or dry heat at the proper temperature is admitted for from five to seven hours, until the gum is sufficiently vulcanized or hardened. The articles are then taken out with a smooth rubber surface, free from grit and blisters. They are then turned in a suitable tumbler containing charcoal and water. They are then pressed, ready for the polishers, by the dies described in my Letters Patent of February 13, 1872.

The articles may be coated with rubber applied by a brush or by dipping, when the rubber paste is made sufficiently thin, like a lacquer or varnish.

I claim—

The process of vulcanizing rubber-coated harness and carriage trimmings by the direct action of steam or dry heat on separately-supported articles, substantially as described.

In testimony that I claim the above-described invention I have hereunto signed my name this 22d day of April, 1872.

ANDREW ALBRIGHT.

Witnesses:
J. C. CLAYTON,
R. C. ELLIOTT.